(12) United States Patent
Richardson et al.

(10) Patent No.: US 10,355,521 B2
(45) Date of Patent: *Jul. 16, 2019

(54) SWITCHING SYSTEMS AND METHODS FOR USE IN UNINTERRUPTIBLE POWER SUPPLIES

(71) Applicant: Alpha Technologies Inc., Bellingham, WA (US)

(72) Inventors: James Patrick Richardson, Bellingham, WA (US); Thanh Quoc Le, Ferndale, WA (US)

(73) Assignee: ALPHA TECHNOLOGIES SERVICES, INC., Bellingham, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/804,977

(22) Filed: Nov. 6, 2017

(65) Prior Publication Data

US 2018/0062427 A1   Mar. 1, 2018

Related U.S. Application Data

(63) Continuation of application No. 14/706,779, filed on May 7, 2015, now Pat. No. 9,812,900, which is a (Continued)

(51) Int. Cl.
*H02J 7/00*      (2006.01)
*H02J 9/06*      (2006.01)
(Continued)

(52) U.S. Cl.
CPC ............... *H02J 9/062* (2013.01); *H02J 9/06* (2013.01); *H02M 1/10* (2013.01);
(Continued)

(58) Field of Classification Search
USPC .......................................... 307/64
See application file for complete search history.

(56) References Cited

U.S. PATENT DOCUMENTS

| 352,105 | A | 11/1886 | Zipernowsky et al. |
| 375,614 | A | 12/1887 | Eickemeyer |

(Continued)

FOREIGN PATENT DOCUMENTS

| AU | 687528 B2 | 2/1998 |
| AU | 2015203667 B2 | 3/2017 |

(Continued)

OTHER PUBLICATIONS

Bridge et al., "Preventing outages without batteries", CED, Jun. 1999, 7 pages.

(Continued)

*Primary Examiner* — Rexford N Barnie
*Assistant Examiner* — Dru Parries
(74) *Attorney, Agent, or Firm* — Michael R. Schacht; Schacht Law Office, Inc.

(57) ABSTRACT

An uninterruptible power supply for providing an output power signal to a load comprises a ferroresonant transformer, a resonant capacitor, and an inverter. The resonant capacitor is operatively connected to the ferroresonant transformer. The inverter is operatively connected to the ferroresonant transformer. The inverter is configured to generate the output power signal based on at least one inverter control signal such that the output power signal is a quasi square wave having at least one change of phase and an upper limit. The at least one inverter control signal is held in an OFF state during at least a portion of the at least one change of phase, pulse-width modulated during at least a portion of the at least one change of phase, and held in an ON state when the output power signal is at the upper limit.

11 Claims, 3 Drawing Sheets

Related U.S. Application Data continuation of application No. 13/352,308, filed on Jan. 17, 2012, now Pat. No. 9,030,045.

(60) Provisional application No. 61/435,317, filed on Jan. 23, 2011.

(51) Int. Cl.
   *H02M 1/10* (2006.01)
   *H02M 1/00* (2006.01)

(52) U.S. Cl.
   CPC .............. H02J 2009/067 (2013.01); H02M 2001/0035 (2013.01); Y02B 70/16 (2013.01); Y10T 307/615 (2015.04)

(56) References Cited

U.S. PATENT DOCUMENTS

| | | |
|---|---|---|
| 414,266 A | 11/1889 | Thomson |
| 1,718,238 A | 6/1929 | Kettering et al. |
| 1,950,396 A | 3/1934 | Boucher |
| 2,007,415 A | 7/1935 | Walker |
| 2,014,101 A | 9/1935 | Bryan |
| 2,037,183 A | 4/1936 | Strieby |
| 2,036,994 A | 12/1936 | Frank et al. |
| 2,085,072 A | 6/1937 | Bobe |
| 2,165,969 A | 7/1939 | Humbert et al. |
| 2,240,123 A | 4/1941 | Shoup et al. |
| 2,302,192 A | 11/1942 | Dannheiser |
| 2,352,073 A | 6/1944 | Boucher et al. |
| 2,427,678 A | 9/1947 | Laging |
| 2,444,794 A | 7/1948 | Uttal et al. |
| 2,512,976 A | 6/1950 | Smeltzly |
| 2,688,704 A | 9/1954 | Christenson |
| 2,856,543 A | 10/1958 | Dixon et al. |
| 2,920,211 A | 1/1960 | Gotoh |
| 2,996,656 A | 8/1961 | Sola |
| 3,022,458 A | 2/1962 | Sola |
| 3,064,195 A | 11/1962 | Freen |
| 3,221,172 A | 11/1965 | Rolison |
| 3,283,165 A | 11/1966 | Bloch |
| 3,293,445 A | 12/1966 | Levy |
| 3,304,599 A | 2/1967 | Nordin |
| 3,305,762 A | 2/1967 | Geib, Jr. |
| 3,339,080 A | 8/1967 | Howald |
| 3,345,517 A | 10/1967 | Smith |
| 3,348,060 A | 10/1967 | Jamieson |
| 3,389,329 A | 6/1968 | Quirk et al. |
| 3,435,358 A | 3/1969 | Rheinfelder |
| 3,458,710 A | 7/1969 | Dodge |
| 3,521,152 A | 7/1970 | Emerson |
| 3,525,035 A | 8/1970 | Kakalec |
| 3,525,078 A | 8/1970 | Baggott |
| 3,546,571 A | 12/1970 | Fletcher et al. |
| 3,590,362 A | 6/1971 | Kakalec |
| 3,636,368 A | 1/1972 | Sia |
| 3,678,284 A | 7/1972 | Peters |
| 3,678,377 A | 7/1972 | Chiffert |
| 3,686,561 A | 8/1972 | Spreadbury |
| 3,691,393 A | 9/1972 | Papachristou |
| 3,742,251 A | 6/1973 | Thompson et al. |
| 3,823,358 A | 7/1974 | Rey |
| 3,859,589 A | 1/1975 | Rush |
| 3,860,748 A | 1/1975 | Everhart et al. |
| 3,873,846 A | 3/1975 | Morio et al. |
| 3,909,560 A | 9/1975 | Martin et al. |
| 3,916,295 A | 10/1975 | Hunter |
| 3,938,033 A | 2/1976 | Borkovitz et al. |
| 3,943,447 A | 3/1976 | Shomo, III |
| 4,004,110 A | 1/1977 | Whyte |
| 4,010,381 A | 3/1977 | Fickenscher et al. |
| 4,122,382 A | 10/1978 | Bernstein |
| 4,130,790 A | 12/1978 | Heisey |
| 4,170,761 A | 10/1979 | Koppehele |
| 4,217,533 A | 8/1980 | Van Beek |
| 4,251,736 A | 2/1981 | Coleman |
| 4,262,245 A | 4/1981 | Wendt |
| 4,270,080 A | 5/1981 | Kostecki |
| 4,277,692 A | 7/1981 | Small |
| 4,313,060 A | 1/1982 | Fickenscher et al. |
| 4,353,014 A | 10/1982 | Willis |
| 4,366,389 A | 12/1982 | Hussey |
| 4,366,390 A | 12/1982 | Rathmann |
| 4,385,263 A | 5/1983 | Luz et al. |
| 4,400,624 A | 8/1983 | Ebert, Jr. |
| 4,400,625 A | 8/1983 | Hussey |
| 4,423,379 A | 12/1983 | Jacobs et al. |
| 4,460,834 A | 7/1984 | Gottfried |
| 4,466,041 A | 8/1984 | Witulski et al. |
| 4,472,641 A | 9/1984 | Dickey et al. |
| 4,475,047 A | 10/1984 | Ebert |
| 4,510,401 A | 4/1985 | Legoult |
| 4,604,530 A | 8/1986 | Shibuya |
| 4,616,305 A | 10/1986 | Damiano et al. |
| 4,628,426 A | 12/1986 | Steigerwald |
| 4,631,471 A | 12/1986 | Fouad et al. |
| 4,656,412 A | 4/1987 | McLyman |
| 4,670,702 A | 6/1987 | Yamada et al. |
| 4,673,825 A | 6/1987 | Raddi et al. |
| 4,686,375 A | 8/1987 | Gottfried |
| 4,697,134 A | 9/1987 | Burkum et al. |
| 4,700,122 A | 10/1987 | Cimino et al. |
| 4,709,318 A | 11/1987 | Gephart et al. |
| 4,719,427 A | 1/1988 | Morishita et al. |
| 4,719,550 A | 1/1988 | Powell et al. |
| 4,775,800 A | 1/1988 | Wood |
| 4,724,290 A | 2/1988 | Campbell |
| 4,724,478 A | 2/1988 | Masuko et al. |
| 4,730,242 A | 3/1988 | Divan |
| 4,733,223 A | 3/1988 | Gilbert |
| 4,740,739 A | 4/1988 | Quammen et al. |
| 4,745,299 A | 5/1988 | Eng et al. |
| 4,748,341 A | 5/1988 | Gupta |
| 4,748,342 A | 5/1988 | Dijkmans |
| 4,763,014 A | 8/1988 | Model et al. |
| 4,791,542 A | 12/1988 | Piaskowski |
| 4,829,225 A | 5/1989 | Podrazhansky et al. |
| 4,860,185 A | 8/1989 | Brewer et al. |
| 4,864,483 A | 9/1989 | Divan |
| 4,882,717 A | 11/1989 | Hayakawa et al. |
| 4,885,474 A | 12/1989 | Johnstone et al. |
| 4,890,213 A | 12/1989 | Seki |
| 4,916,329 A | 4/1990 | Dang et al. |
| 4,920,475 A | 4/1990 | Rippel |
| 4,922,125 A | 5/1990 | Casanova et al. |
| 4,926,084 A | 5/1990 | Furutsu et al. |
| 4,943,763 A | 7/1990 | Bobry |
| 4,952,834 A | 8/1990 | Okada |
| 4,954,741 A | 9/1990 | Furutsu et al. |
| 4,975,649 A | 12/1990 | Bobry |
| 4,988,283 A | 1/1991 | Nagasawa et al. |
| 5,010,469 A | 4/1991 | Bobry |
| 5,017,800 A | 5/1991 | Divan |
| 5,027,264 A | 6/1991 | DeDoncker et al. |
| 5,029,285 A | 7/1991 | Bobry |
| 5,057,698 A | 10/1991 | Widener et al. |
| 5,099,410 A | 3/1992 | Divan |
| 5,137,020 A | 8/1992 | Wayne et al. |
| 5,148,043 A | 9/1992 | Hirata et al. |
| 5,154,986 A | 10/1992 | Takechi et al. |
| 5,168,205 A | 12/1992 | Kan et al. |
| 5,172,009 A | 12/1992 | Mohan |
| 5,185,536 A | 2/1993 | Johnson, Jr. et al. |
| 5,193,067 A | 3/1993 | Sato et al. |
| 5,198,698 A | 3/1993 | Paul et al. |
| 5,198,970 A | 3/1993 | Kawabata et al. |
| 5,200,643 A | 4/1993 | Brown |
| 5,224,025 A | 6/1993 | Divan et al. |
| 5,229,650 A | 7/1993 | Kita et al. |
| 5,237,208 A | 8/1993 | Tominaga et al. |
| 5,281,919 A | 1/1994 | Palanisamy |
| 5,302,858 A | 4/1994 | Folts |
| 5,334,057 A | 8/1994 | Blackwell |
| 5,400,005 A | 3/1995 | Bobry |

(56) References Cited

U.S. PATENT DOCUMENTS

| | | |
|---|---|---|
| 5,402,053 A | 3/1995 | Divan et al. |
| 5,410,720 A | 4/1995 | Osterman |
| 5,440,179 A | 8/1995 | Severinsky |
| 5,457,377 A | 10/1995 | Jonsson |
| 5,483,463 A | 1/1996 | Qin et al. |
| 5,532,525 A | 7/1996 | Kaiser et al. |
| 5,579,197 A | 11/1996 | Mengelt et al. |
| 5,602,462 A | 2/1997 | Stich et al. |
| 5,610,451 A | 3/1997 | Symonds |
| 5,635,773 A | 6/1997 | Stuart |
| 5,638,244 A | 6/1997 | Mekanik et al. |
| 5,642,002 A | 6/1997 | Mekanik et al. |
| 5,739,595 A | 4/1998 | Mekanik et al. |
| 5,745,356 A | 4/1998 | Tassitino, Jr. et al. |
| 5,747,887 A | 5/1998 | Takanaga et al. |
| 5,747,888 A | 5/1998 | Zilberberg |
| 5,760,495 A | 6/1998 | Mekanik |
| 5,768,117 A | 6/1998 | Takahashi et al. |
| 5,783,932 A | 7/1998 | Namba et al. |
| 5,790,391 A | 8/1998 | Stich et al. |
| 5,804,890 A | 9/1998 | Kakalec et al. |
| 5,844,327 A | 12/1998 | Batson |
| 5,880,536 A | 3/1999 | Mardirossian |
| 5,892,431 A | 4/1999 | Osterman |
| 5,897,766 A | 4/1999 | Kawatsu |
| 5,901,057 A | 5/1999 | Brand et al. |
| 5,925,476 A | 7/1999 | Kawatsu |
| 5,961,604 A | 10/1999 | Anderson et al. |
| 5,982,412 A | 11/1999 | Nulty |
| 5,982,645 A | 11/1999 | Levran et al. |
| 5,982,652 A | 11/1999 | Simonelli et al. |
| 5,994,793 A | 11/1999 | Bobry |
| 5,994,794 A | 11/1999 | Wehrlen |
| 6,011,324 A | 1/2000 | Kohlstruck et al. |
| 6,014,015 A | 1/2000 | Thorne et al. |
| 6,028,414 A | 2/2000 | Chouinard et al. |
| 6,069,412 A | 5/2000 | Raddi et al. |
| 6,074,246 A | 6/2000 | Seefeldt et al. |
| 6,100,665 A | 8/2000 | Alderman |
| 6,198,178 B1 | 3/2001 | Schienbein et al. |
| 6,212,081 B1 | 4/2001 | Sakai |
| 6,218,744 B1 | 4/2001 | Zahrte et al. |
| 6,288,456 B1 | 9/2001 | Cratty |
| 6,288,916 B1 | 9/2001 | Liu et al. |
| 6,295,215 B1 | 9/2001 | Faria et al. |
| 6,348,782 B1 | 2/2002 | Oughton et al. |
| 6,426,610 B1 | 7/2002 | Janik |
| 6,433,905 B1 | 8/2002 | Price et al. |
| 6,465,910 B2 | 10/2002 | Young et al. |
| 6,486,399 B1 | 11/2002 | Armstrong et al. |
| 6,602,627 B2 | 8/2003 | Liu et al. |
| 6,738,435 B1 | 5/2004 | Becker |
| 6,841,971 B1 | 1/2005 | Spée et al. |
| 6,906,933 B2 | 6/2005 | Taimela |
| 6,933,626 B2 | 8/2005 | Oughton |
| 7,040,920 B2 | 5/2006 | Johnson et al. |
| 7,182,632 B1 | 2/2007 | Johnson et al. |
| 7,449,798 B2 | 11/2008 | Suzuki et al. |
| 7,567,520 B2 | 7/2009 | Ostrosky |
| 8,575,779 B2 | 11/2013 | Le et al. |
| 9,030,045 B2 | 5/2015 | Richardson et al. |
| 9,030,048 B2 | 5/2015 | Heidenreich et al. |
| 9,234,916 B2 | 1/2016 | Peck et al. |
| 9,633,781 B2 | 4/2017 | Le et al. |
| 9,812,900 B2 | 11/2017 | Richardson et al. |
| 2005/0258927 A1 | 11/2005 | Lu |
| 2007/0262650 A1 | 11/2007 | Li |
| 2009/0076661 A1 | 3/2009 | Pearson et al. |
| 2009/0196082 A1 | 8/2009 | Mazumder et al. |
| 2009/0240377 A1 | 9/2009 | Batzler et al. |
| 2010/0324548 A1 | 12/2010 | Godara et al. |
| 2011/0187197 A1 | 8/2011 | Moth |
| 2011/0238345 A1 | 9/2011 | Gauthier et al. |
| 2011/0273151 A1 | 11/2011 | Lesso et al. |
| 2012/0091811 A1 | 4/2012 | Heidenreich et al. |
| 2012/0212051 A1 | 8/2012 | Heidenreich et al. |
| 2012/0217800 A1 | 8/2012 | Heidenreich et al. |
| 2012/0217806 A1 | 8/2012 | Heidenreich et al. |
| 2012/0217808 A1 | 8/2012 | Richardson et al. |
| 2014/0062189 A1 | 3/2014 | Le et al. |
| 2017/0229906 A1 | 8/2017 | Le et al. |
| 2018/0062427 A1 | 3/2018 | Richardson et al. |

FOREIGN PATENT DOCUMENTS

| | | |
|---|---|---|
| CA | 1265231 A | 1/1990 |
| CA | 2033685 A1 | 10/1991 |
| CA | 2036296 A1 | 11/1991 |
| CA | 1297546 C | 3/1992 |
| CA | 2086897 A1 | 7/1993 |
| CA | 2149845 A1 | 12/1995 |
| CA | 2168520 A1 | 8/1996 |
| CA | 2028269 A1 | 1/2000 |
| CA | 2403888 A1 | 9/2001 |
| CA | 2713017 A1 | 7/2009 |
| CA | 2504101 A1 | 5/2010 |
| CA | 2760581 A1 | 11/2010 |
| DE | 2602789 A1 | 7/1977 |
| DE | 2809514 A1 | 9/1978 |
| DE | 3321649 A1 | 12/1983 |
| EP | 0284541 A2 | 9/1988 |
| EP | 0196004 B1 | 11/1993 |
| EP | 2425515 A2 | 3/2012 |
| EP | 2587620 A2 | 5/2013 |
| FR | 762789 | 4/1934 |
| FR | 861215 | 2/1941 |
| GB | 005201 | 4/1885 |
| GB | 260731 | 9/1925 |
| GB | 2005118 A | 4/1979 |
| GB | 2120474 A | 11/1983 |
| GB | 2137033 A | 3/1984 |
| GB | 2171861 A | 9/1986 |
| GB | 2185326 A | 10/1986 |
| GB | 2355350 A | 4/2001 |
| JP | 5482053 | 6/1979 |
| JP | S5482053 A | 6/1979 |
| JP | 55032133 | 3/1980 |
| JP | S5532133 A | 3/1980 |
| JP | 5650417 | 5/1981 |
| JP | S5650417 A | 5/1981 |
| JP | 56155420 | 12/1981 |
| JP | S56155420 A | 12/1981 |
| JP | 2000350381 A | 12/2000 |
| JP | 2001190035 A | 7/2001 |
| JP | 2005295776 A | 10/2005 |
| JP | 2010136547 A | 6/2010 |
| RU | 2221320 C2 | 10/2004 |
| TW | 200941897 A | 10/2009 |
| TW | I539721 | 6/2016 |
| WO | 8501842 A1 | 4/1985 |
| WO | 0021180 A1 | 4/2000 |
| WO | 2009094540 A2 | 7/2009 |
| WO | 2010135406 A1 | 11/2010 |
| WO | 2011103131 A3 | 12/2011 |
| WO | 2012099911 A1 | 7/2012 |
| WO | 2012148512 A1 | 11/2012 |
| WO | 2012112252 A3 | 1/2013 |

OTHER PUBLICATIONS

Broadband Business and News Perspective, "Cable operators feeling power surge", Reprinted from CED, Apr. 2000, 4 pages.

Contino et al., Water-Cooling Applications for Telecommunications and Computer Energy Systems, Telecommunications Energy Conference, IEEE, 1988, pp. 441-447.

H.C. Gerdes et al., A Practical Approach to Understanding Ferroresonance, EEE—Circuit Design Engineering, pp. 87-89, Apr. 1966.

Harry P. Hart et al., The Derivation and Application of Design Equations for Ferroresonant Voltage Regulators and Regulated Rectifiers, IEEE Transactions on Magnetics, vol. MAG-7, No. 1, Mar. 1971, pp. 205-211.

(56) References Cited

OTHER PUBLICATIONS

IEEE Standard for Ferroresonant Voltage Regulators, Electronics Transformer Technical Committee of the IEEE Power Electronics Society, IEEE Std. 449-1990, May 16, 1990, 29 pages.
International Search Report, PCT/US99/19677, dated Feb. 8, 2000, 5 pages.
International Searching Authority, "PCT/US2011/025000", International Search Report, dated Oct. 26, 2011, 9 pages.
International Searching Authority, "PCT/US2012/021619", International Search Report, dated May 17, 2012, 7 pages.
International Searching Authority, PCT Notification of Transmittal of the International Search Report and the Written Opinion of the International Searching Authority, or the Declaration, dated Dec. 8, 2016, 8 pages.
Ivensys, "Power When You Really Need It!", Publication No. CSG29FXA, Feb. 2000, 2 pages.
Ivensys, "Sometimes Less Is More!", Publication No. CSG28FXA, Feb. 2000, 2 pages.
Jain et al., High Frequency Triport UPS Topologies for Emerging Fiber Networks, Telecommunications Energy Conference, IEEE, 1998, pp. 505-512.
Jefferson T. Mitchell et al., Rectifiers and Energy Conservation, Telecommunications, Mar. 1979, 3 pages.
Kakalec, "A Feedback-Controlled Ferroresonant Voltage Regulator," IEEE Transactions of Magnetics, Mar. 1970, 5 pages, vol. MAG-6, No. 1.
Lectro Products Incorporated, "Lectro Ferro Family", Publication No. CSGI6FXA, Nov. 1998, 4 pages.
Lectro Products Incorporated, "Solving CATV Power Solutions", Publication No. CSG24FYA, Jun. 1999, 12 pages.
Marcotte et al., "Powering Cable TV Systems", Reprinted from Broadband Systems & Design, Jun. 1996, 4 pages.
Marcotte, "Power migration strategies for future-proofing", Reprinted from CED Magazine, Jun. 1997, 4 pages.
McGraw-Hill, Dictionary of Scientific and Technical Terms Fifth Edition, p. 745 and pp. 1696-1697, 1994.
Multipower, Inc., "Confluence Newsletters, vols. I and II", "MP 900", and "MP1350", web site http://www.multipowerups.com/index.htm, Aug. 2000, 16 pages.
RANDO, AC Tripoli—A New Uninterruptible AC Power Supply, Telephone Energy Conference, IEEE, 1978, pp. 50-58.
Rex Teets, Application and Design of Ferroresonant Transformers, No Date, pp. 28-34.
Robert J. Kakalec et al., New Technology for Battery-Charging Rectifiers, Bell Laboratories Record, May 1979, pp. 131-134.
Spears, "Disturbances Can Toast Your System", Reprint from Communications Technology, Apr. 2000, 4 pages.
Stewart Nowak, Power Problems: Selecting a UPS, Electronics Test, Jul. 13, 1990, 4 pages, No. 7, San Francisco, CA, US.
Wallace et al., Wireless Load Sharing of Single Phase Telecom Inverters, Telecommunication Energy Conference, 1999, 13 pages.
Xia, Ordinary Meter Measures Battery Resistance, EDN—Design Ideas, Jun. 24, 1993, 2 pages.

SWITCHING SYSTEMS AND METHODS FOR USE IN UNINTERRUPTIBLE POWER SUPPLIES

RELATED APPLICATIONS

This application, U.S. patent application Ser. No 15/804,977 filed Nov. 6, 2017, is a continuation of U.S. patent application Ser. No. 14/706,779 filed May 7, 2015, now U.S. Pat. No. 9,812,900, which issued on Nov. 7, 2017.

U.S. patent application Ser. No. 14/706,779 is a continuation of U.S. patent application Ser. No. 13/352,308 filed Jan. 17, 2012, now U.S. Pat. No. 9,030,045, which issued on May 12, 2015.

U.S. patent application Ser. No. 13/352,308 filed Jan. 17, 2012, claims benefit of U.S. Provisional Patent Application Ser. No. 61/435,317 filed Jan. 23, 2011.

The contents of the related applications listed above are incorporated herein by reference.

TECHNICAL FIELD

The present invention relates the generation of a standby power signal and, more specifically, to uninterruptible power supply systems and methods that generate a standby signal using an inverter system.

BACKGROUND

Uninterruptible power supplies (UPS's) have long been used to provide at least temporary auxiliary power to electronic devices. Typically, a UPS is configured to switch between a primary power source and a standby power source as necessary to maintain constant power to a load. Typically, the primary power source for a UPS is a utility power supply, and the standby power source may take the form of a battery system. The UPS will normally operate in a line mode in which the utility power signal is passed to the load when the utility power signal is within predefined parameters. In the line mode, the UPS will typically also charge the battery system. When the utility power falls outside of the predefined parameters, the UPS will switch to standby mode in which an AC signal is generated based on the energy stored in the battery system.

A class of UPS's employs a ferroresonant transformer. A ferroresonant transformer is a saturating transformer that employs a tank circuit comprised of a resonant winding and capacitor to produce a nearly constant average output even if the input to the transformer varies. A typical UPS employing a ferroresonant transformer takes advantage of the voltage regulating properties of a ferroresonant transformer in both line and standby modes. In the context of a UPS, a ferroresonant transformer thus provides surge suppression, isolation, short circuit protection, and voltage regulation without the use of active components.

Conventionally, in line mode, a UPS employs an inverter circuit configured to form a switch mode power supply. An inverter circuit configured as a switch mode power supply typically comprises at least one and typically a plurality of power switches that are operated according to a pulse-width modulated (PWM) signal. The PWM method of generating an AC signal from a DC source allows the amplitude of the AC signal to be determined at any point in time by controlling the duty cycle at which the inverter power switches are operated. Controlling the duty cycle at which the inverter power switches are operated produces, through an output LC filter, a desired net average voltage. Typically, the parameters of the inverter control signal are varied according to a control signal generated by a feedback loop having an input formed by at least one characteristic, such as voltage, of the AC signal.

In a switch mode power supply, one of the major causes of loss of efficiency arises from the imperfect switching characteristics of modern power switches during the transition between the ON and OFF configurations of the power switches. An object of the present invention is to provide switch mode power supplies for use in UPS systems having improved efficiency.

SUMMARY

The present invention may be embodied as an uninterruptible power supply for providing an output power signal to a load comprising a ferroresonant transformer, a resonant capacitor, and an inverter. The resonant capacitor is operatively connected to the ferroresonant transformer. The inverter is operatively connected to the ferroresonant transformer. The inverter is configured to generate the output power signal based on at least one inverter control signal such that the output power signal is a quasi square wave having at least one change of phase and an upper limit. The at least one inverter control signal is held in an OFF state during at least a portion of the at least one change of phase, pulse-width modulated during at least a portion of the at least one change of phase, and held in an ON state when the output power signal is at the upper limit.

The present invention may also be embodied as a method of providing an output power signal to a load comprising the following steps. A resonant capacitor is operatively connected to a ferroresonant transformer. An inverter is operatively connected to the ferroresonant transformer. The inverter is configured to generate the output power signal based on at least one inverter control signal such that the output power signal is a quasi square wave having at least one change of phase and an upper limit. The at least one inverter control signal is held in an OFF state during at least a portion of the at least one change of phase. The at least one inverter control signal is pulse-width modulated during at least a portion of the at least one change of phase. The at least one inverter control signal is held in an ON state when the output power signal is at the upper limit.

DETAILED DESCRIPTION

Figure 1:
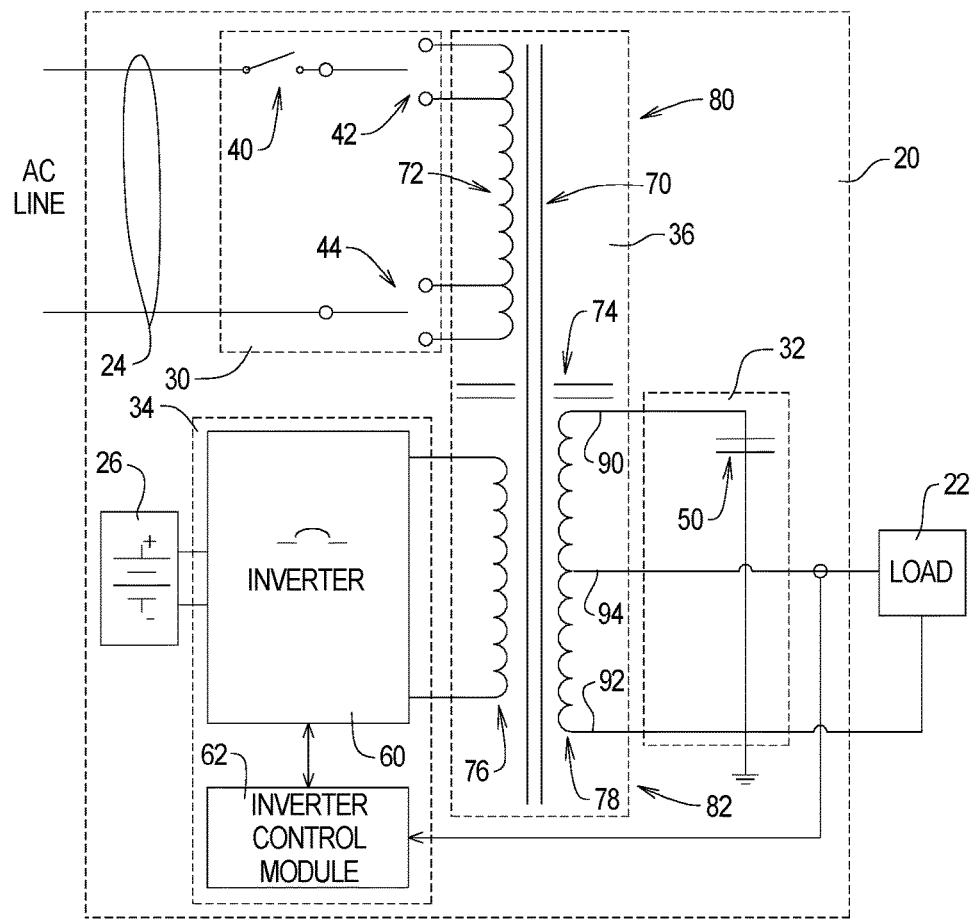
FIG. 1 is a simplified block diagram of a first embodiment of an uninterruptible power supply system using a ferroresonant transformer system constructed in accordance with, and embodying, the principles of the present invention.

Referring initially to FIG. 1 of the drawing, depicted therein is a first example of an uninterruptible power supply (UPS) system 20 constructed in accordance with, and embodying, the principles of the present invention. The present invention is of particular significance when applied to a UPS system adapted for use in a communications system, such as CATV or telephony system, and that use of the present invention will be disclosed herein in detail. However, it should be understood that the principles of the present invention may be applied to UPS systems adapted for use in environments other than communications systems.

The example UPS system 20 supplies power to a load 22 based on a primary power signal present on an AC power line 24 (line mode) or a secondary power signal generated by a battery pack 26 (standby mode). While the example secondary power signal is generated by a battery pack in the example UPS system 20, alternative power sources such as generators, fuel cells, solar cells, and the like may be used as the secondary power source.

The example UPS system 20 comprises an input section 30, an output section 32, an inverter section 34, and a ferroresonant transformer 36. The example input section 30 comprises a main switch 40 and first and second select switches 42 and 44. The example output section 32 comprises an output (e.g., resonant) capacitor 50. The output capacitor 50 forms a resonant or tank circuit with the transformer 36 as will be described in further detail below.

The inverter section 34 comprises an inverter circuit 60 and a controller 62. The inverter circuit 60 may be an H-bridge circuit or any other circuit capable of producing an appropriate AC power signal based on a DC power signal obtained from the battery pack 26. The inverter circuit 60 is or may be conventional and will not be described herein in further detail.

The example controller 62 controls the inverter circuit 60. The controller 62 may further control the charging of the battery pack 26 when the UPS system 20 operates in line mode based on temperature, voltage, and/or current signals associated with the battery pack 26.

The example inverter circuit 60 is pulse-width modulated, and the inverter section 34 functions as a switch mode power supply when the UPS system operates in the standby mode. As will be described in further detail below, the controller 62 generates one or more inverter control signals that control the inverter circuit to generate a switched output signal.

The example ferroresonant transformer 36 comprises a core 70, input windings 72, an inductor 74, inverter windings 76, and output windings 78. The core 70 is or may be a conventional laminate structure. The inductor 74 defines a primary side 80 and a secondary side 82 of the transformer 36. In the example UPS system 20, the output capacitor 50 is connected across first and second ends 90 and 92 of the output windings 78, and the load is connected between the second end 92 of the output windings 78 and a tap 94 in the output windings 78.

In the example transformer 36, only the input windings 72 are on the primary side 80 of the transformer 36. The inverter windings 76 and output windings 78 are on the secondary side 82 of the transformer 36. In particular, the output windings 78 are arranged between the inverter windings 76 and the inductor 74, and the inductor 74 is arranged between the output windings 78 and the input windings 72. A ferroresonant transformer appropriate for use as the example ferroresonant transformer 36 is described, for example, in U.S. Patent Application Ser. No. 60/305,926 and Ser. No. 12/803,787, and those applications are incorporated herein by references. The principles of the present invention may, however, be applied to other configurations of ferroresonant transformers.

In line mode, the main switch 40 is closed and the AC power line 24 is present on the input windings 72. The input windings 72 are electromagnetically coupled to the output windings 78 such that a primary AC output signal is supplied to the load 22 when the UPS system 20 operates in the line mode.

In standby mode, the main switch 40 is opened, and the battery pack 26 and inverter section 34 form a secondary power source supplies a standby AC output signal to the load 22. In particular, in standby mode the inverter section 34 generates the switched power signal across the inverter windings 76, and the inverter windings 76 are electromagnetically coupled to the output windings 78 and to the output capacitor such that the standby AC output signal is present across the tap 94 and the second end 92 of the output windings 78. Further, during standby mode, an optional switch (not shown) may be provided in series with the output capacitor 50 to allow the output capacitor 50 to be disconnected from the output windings, thereby reducing peak inverter currents observed due to charging and discharging of the output capacitor 50.

The example inverter section 34 conventionally comprises at a plurality of power switches (not shown) configured as a switch mode power supply. Typically, the power switches are MOSFETS configured as an H-bridge circuit or any other circuit capable of producing an appropriate standby AC power signal based on a DC power signal obtained from the battery pack 26.

The inverter control module 62 generates one or more inverter control signals based on a characteristic, such as voltage, of the standby AC output signal applied to the load 22. The inverter control signal or signals may be pulse-width modulated (PWM) signals the characteristics of which cause the power switches of the inverter circuit 60 to open and close as necessary to generate the standby AC output signal within predetermined voltage, frequency, and waveform parameters. In the example UPS system 20 operating in standby mode, the inverter circuit 60, inverter control circuit 62, the inverter windings 76, and output windings 78 thus form a feedback loop that controls a desired net average voltage as appropriate for the load 22.

The Applicants have recognized that loads, such as the example load 22 to which power is supplied by a UPS used in communications networks such as CATV networks, are constant power loads that typically employ a diode rectifier circuit supplying a large capacitor bank. Such loads demand very high current at the peak AC power voltage at the instant the AC voltage amplitude exceeds the bus capacitor voltage. The Applicants further recognized that a substantial portion, if not all, of the load power will be delivered in the period during which the AC voltage amplitude is higher than the DC bus capacitor. This results in higher peak current to compensate for the fact that less than 100% of the time is available to transfer energy to the load.

The inverter control module 62 of the present invention thus eliminates the pulse-width modulation at the peak of the standby AC output signal. The Applicant has discovered that the elimination of pulse-width modulation at the peak of the standby AC output signal allows the power switches of the inverter circuit 60 to be full ON (100% duty cycle) during the time of peak current transfer to the bus capacitors. Eliminating pulse-width modulation of the inverter control signal during at least part of the cycle of the standby AC output signal significantly improves (by between approximately 10-20%) the efficiency of the UPS system 20 when operating in standby mode.

Figure 2:
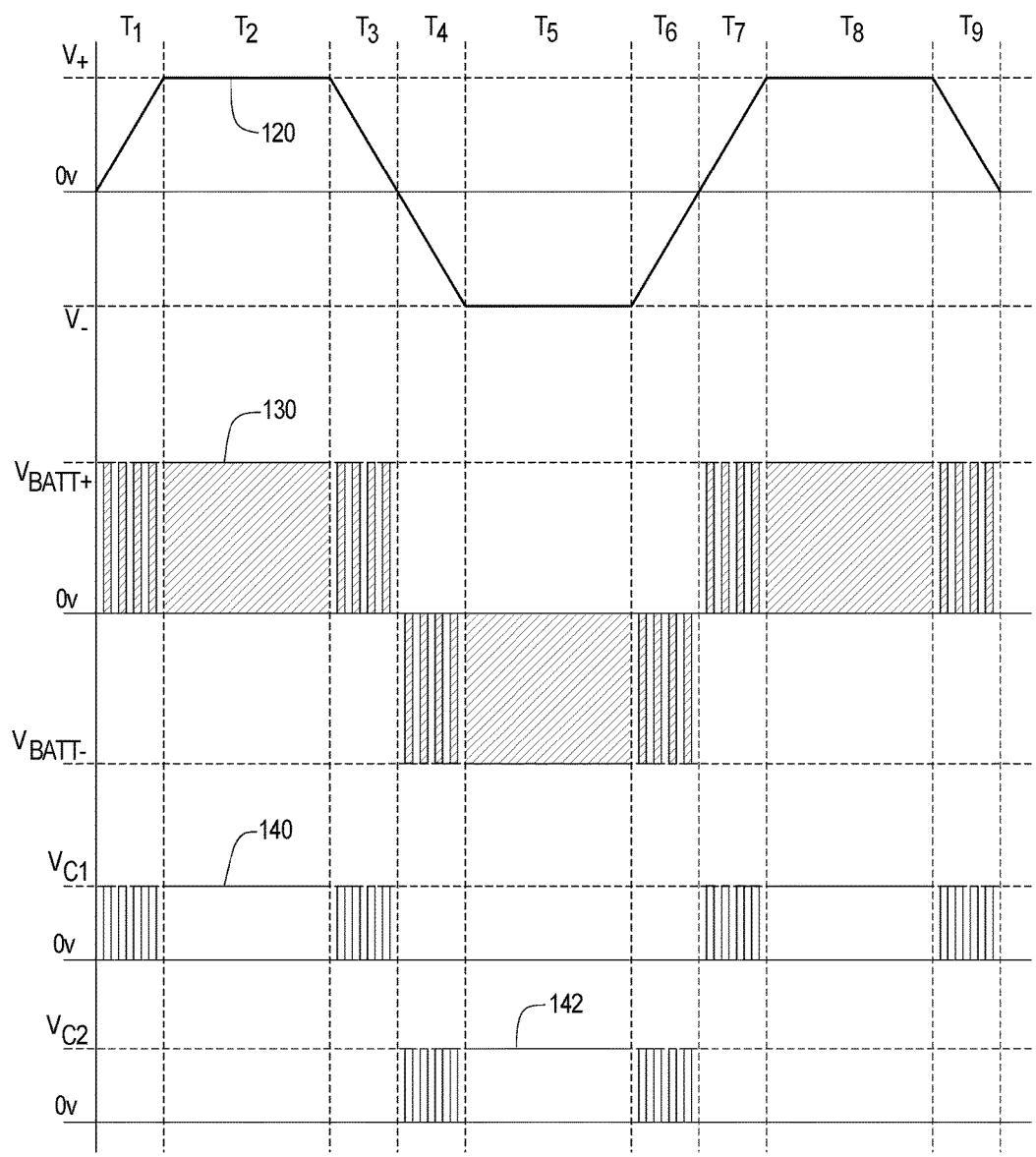
FIG. 2 is a timing diagram representing control and power signals employed by the UPS system depicted in FIG. 1.

Referring now to FIG. 2 of the drawing, depicted therein are several waveforms that may be implemented by the example UPS system 20 operating in standby mode. FIG. 2 conventionally plots each voltage (y-axis) versus time (x-axis). FIG. 2 is further divided into first through ninth time periods $T_{1-9}$ separated by vertical broken lines.

Depicted at 120 is an example standby AC output signal 120 supplied to the load 22. Depicted at 130 in FIG. 2 is an example switched power signal 130 generated by the inverter section 34 and applied across the inverter windings 76. Depicted at 140 and 142 in FIG. 2 are representations of inverter control signals that may be generated by the inverter control module 62 for controlling the inverter power switches of the inverter circuit 60. As is conventional, the first inverter control signal using the principles of the present invention, the inverter control signals 140 and 142 may operate at a relatively high frequency, e.g., approximate 20 kHz, with a duty cycle that is varied between 0% and 100% as described below to obtain the desired waveform.

The period of peak current transfer occurs in the time periods $T_2$, $T_5$, and $T_8$ in FIG. 2. During these periods, the inverter control signal generated by the inverter control module 62 for controlling the inverter circuit 60 is held in a state that closes the power switches (100% duty cycle) of the inverter circuit 60. FIG. 2 further shows that the switched power signal 130 generated by the example inverter section 34 is pulse-width modulated (switched between OFF and ON) during the time periods $T_1$, $T_3$, $T_4$, $T_6$, $T_7$ and $T_9$ outside of the periods of peak current transfer and is held HIGH (100% duty cycle) during the time periods $T_2$, $T_5$, and $T_8$. The operation of these switches of the inverter circuit 60 in their least efficient mode (from ON to OFF or from OFF to ON) is thus avoided during the period of peak current transfer to the load 22. The inverter control signals 140 and 142 represent one example method of controlling an inverter circuit such as the example inverter circuit 60 to generate the switched power signal 130 and standby AC output signal 120 as depicted in FIG. 2.

The example standby AC output signal 120 depicted in FIG. 2 is what is referred to as a modified or quasi square wave. A standby AC power signal having a modified or quasi square wave, such as the example signal 120, is appropriate for providing power to the load 22.

Figure 3:
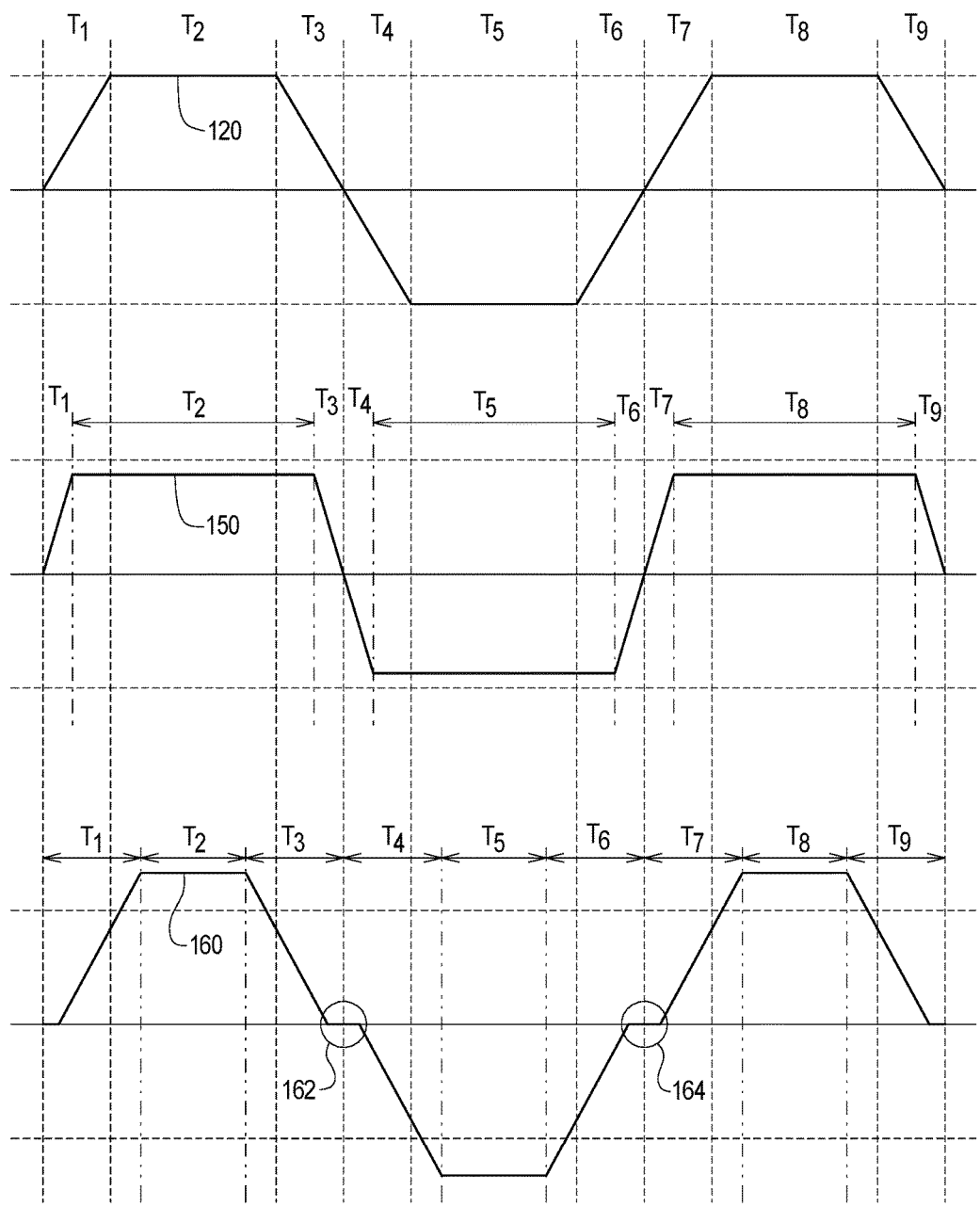
FIG. 3 depicts a first quasi-square wave form, a second quasi-square wave form, and a third quasi-square waveform.

To provide voltage regulation, the duration of the periods of time $T_2$, $T_5$, and $T_5$ in which the switches are operated at 100% duty cycle (held ON) can be varied as shown in FIG. 3. FIG. 3 illustrates second and third example standby AC power signals 150 and 160; the example standby AC power signal 120 is also reproduced in FIG. 3 for reference. The second example standby AC power signal 150 corresponds to a load having a low DC bus relative to the mid DC bus of the load corresponding to the first example standby AC output signal 120. The third example standby AC power signal 160 corresponds to a load having a high DC bus relative to the mid DC bus of the load corresponding to the first example standby AC output signal 120.

Additionally, to provide voltage regulation and maintain an acceptable modified or quasi square wave, the inverter control signals 140 and 142 are generated to alter the dV/dt, or slope, of the standby AC power signal 120 during the time periods $T_1$, $T_3$, $T_4$, $T_6$, $T_7$ and $T_9$ outside of the periods of peak current transfer. Additionally, the switched power signal 130 may be held at zero during phase change transitions to allow more control of voltage regulation.

The second example standby AC power signal 150 thus has a lower peak voltage during peak current transfer in the time periods $T_2$, $T_5$, and $T_5$ and steeper slope during the time periods $T_1$, $T_3$, $T_4$, $T_6$, $T_7$ and $T_9$ outside of the periods of peak current transfer. The steeper slope in the time periods $T_1$, $T_3$, $T_4$, $T_6$, $T_7$ and $T_9$ is obtained by appropriate control of the duty cycle of the switched power signal 130.

The third example standby AC power signal 160, on the other hand, has a higher peak voltage during peak current transfer in the time periods $T_2$, $T_5$, and $T_8$. The slope of the third example standby AC power signal is similar to the slope of the first example AC power signal 160 during the time periods $T_1$, $T_3$, $T_4$, $T_6$, $T_7$ and $T_9$ outside of the periods of peak current transfer. However, the third example standby AC power signal 160 is held at zero for a short time during crossover periods 162 and 164 when the AC power signal 160 changes phase. The zero voltage at the crossover periods 162 and 164 is obtained by turning the switched power signal 130 OFF (0% duty cycle) during the crossover periods 162 and 164.

More generally, the switching pattern of the inverter control signals and the design of the transformer are optimized to provide maximum efficiency across the specified output voltage and specified load range. Relevant optimization schemes include providing enough volt-seconds to the inverter winding to meet the voltage requirements of the load but not so many volt-seconds that the transformer saturates.

Given the foregoing, it should be apparent that the principles of the present invention may be embodied in forms other than those described above. The scope of the present invention should thus be determined by the claims to be appended hereto and not the foregoing detailed description of the invention.

What is claimed is:

1. An uninterruptible power supply for providing an output power signal to a load comprising:
   a ferroresonant transformer;
   a resonant capacitor operatively connected to the ferroresonant transformer; and
   an inverter operatively connected to the ferroresonant transformer, wherein:
   the inverter is configured to generate the output power signal based on at least one inverter control signal such that the output power signal is a quasi square wave having at least one change of phase and an upper limit; and
   the at least one inverter control signal is
      held in an OFF state during at least a portion of the at least one change of phase,
      pulse-width modulated during at least a portion of the at least one change of phase, and
      held in an ON state when the output power signal is at the upper limit.

2. An uninterruptible power supply as recited in claim 1, in which:
   the output power signal defines a plurality of changes of phase;
   the at least one inverter control signal is pulse-width modulated during at least a portion of each of the plurality of changes of phase, and
   held in an OFF state during at least a portion of each of the plurality of changes of phase.

3. An uninterruptible power supply as recited in claim 1, in which a duration of the ON state is varied to regulate the upper limit of the output power signal.

4. An uninterruptible power supply as recited in claim 1, in which a duty cycle of the at least one inverter control signal is varied to control a slope of the output power signal.

5. An uninterruptible power supply as recited in claim 1, in which:
   the quasi square wave of the output power signal further has a lower limit;
   the inverter section generates the standby power signal based on first and second inverter control signals;

the first inverter control signal is held in an ON state when the output power signal is at the upper limit; and the second inverter control signal is held in an ON state when the output power signal is at the lower limit.

6. A method of providing an output power signal to a load comprising the steps of:

operatively connecting a resonant capacitor to a ferroresonant transformer;

operatively connecting an inverter to the ferroresonant transformer;

configuring the inverter to generate the output power signal based on at least one inverter control signal such that the output power signal is a quasi square wave having at least one change of phase and an upper limit;

holding the at least one inverter control signal in an OFF state during at least a portion of the at least one change of phase;

pulse-width modulating the at least one inverter control signal during at least a portion of the at least one change of phase; and holding the at least one inverter control signal in an ON state when the output power signal is at the upper limit.

7. A method as recited in claim 6, further comprising the steps of:

configuring the inverter such that the output power signal defines a plurality of changes of phase;

pulse-width modulating the at least one inverter control signal during at least a portion of each of the plurality of changes of phase; and holding the at least one inverter control signal in an OFF state during at least a portion of each of the plurality of changes of phase.

8. A method as recited in claim 6, further comprising the step of varying a duration of the ON state to regulate the upper limit of the output power signal.

9. A method as recited in claim 6, further comprising the step of varying a duty cycle of the at least one inverter control signal to control a slope of the output power signal.

10. A method as recited in claim 6, further comprising the steps of:

configuring the inverter such that the quasi square wave of the output power signal further has a lower limit;

generating the standby power signal based on a first inverter control signal that is held in an ON state when the output power signal is at the upper limit; and generating the standby power signal based on a second inverter control signal that is held in an ON state when the output power signal is at the lower limit.

11. A method as recited in claim 6, further comprising the step of generating the standby power signal based on first and second inverter control signals such that the first and second inverter control signals are in an OFF state during at least a portion of each of the plurality of changes of phase.

* * * * *